United States Patent [19]

Funabiki et al.

[11] Patent Number: 5,202,300

[45] Date of Patent: Apr. 13, 1993

[54] CATALYST FOR PURIFICATION OF EXHAUST GAS

[75] Inventors: Masaki Funabiki, Mishima; Kunihide Kayano; Teiji Yamada, both of Numazu, all of Japan

[73] Assignee: Engelhard Corporation, Iselin, N.J.

[21] Appl. No.: 602,889

[22] Filed: Oct. 23, 1990

Related U.S. Application Data

[63] Continuation of Ser. No. 302,505, Jan. 26, 1989, abandoned.

[30] Foreign Application Priority Data

Feb. 18, 1988 [JP] Japan ................................. 63-34060

[51] Int. Cl.$^5$ ..................... B01J 21/04; B01J 21/06; B01J 23/10; B01J 23/58
[52] U.S. Cl. ................................. 502/304; 423/213.5
[58] Field of Search ..................... 502/304; 423/213.5

[56] References Cited

U.S. PATENT DOCUMENTS

| | | | |
|---|---|---|---|
| 3,919,120 | 11/1975 | Kato et al. | 252/466 B |
| 4,056,489 | 11/1977 | Hindin et al. | 252/462 |
| 4,294,726 | 10/1981 | Bozon et al. | 252/462 |
| 4,581,343 | 4/1986 | Blanchard et al. | 562/241 |
| 4,587,231 | 5/1986 | Sawamura et al. | 502/304 |
| 4,678,770 | 7/1987 | Wan et al. | 502/304 |
| 4,680,282 | 7/1987 | Blanchard et al. | 502/304 |
| 4,857,499 | 8/1989 | Ito et al. | 502/326 |

FOREIGN PATENT DOCUMENTS

| | | |
|---|---|---|
| 0126676 | 11/1984 | European Pat. Off. |
| 0142858 | 5/1985 | European Pat. Off. |
| 3809226 | 9/1988 | Fed. Rep. of Germany |
| 2168502 | 8/1973 | France |
| 2449475 | 9/1980 | France |
| 1409100 | 10/1975 | United Kingdom |
| 2048101 | 12/1980 | United Kingdom |

*Primary Examiner*—W. J. Shine

[57] ABSTRACT

A catalyst composition comprising a refractory support having deposited thereon an active layer containing a platinum group metal component comprising an alumina component having the platinum group metals rhodium and palladium dispersed thereon, a cerium compound, a strontium compound, and a zirconium compound.

5 Claims, No Drawings

CATALYST FOR PURIFICATION OF EXHAUST GAS

This is a continuation of copending application Ser. No. 07/302,505 filed on Jan. 26, 1989, now abandoned.

DETAILED DESCRIPTION OF THE INVENTION

This invention relates to a catalyst for purification of a waste gas exhausted from an internal combustion engine of an automobile or the like, and to a process for its production. More specifically, this invention relates to a catalyst which can show an excellent exhaust gas purifying capability at lower temperatures even after it is exposed to high temperatures, and a process for producing this catalyst by simultaneously adding a cerium compound, a zirconium compound and a strontium compound to active alumina containing palladium and rhodium.

Catalysts containing a platinum-group element and cerium oxide having an oxygen storing effect for increased low-temperature activity are now mainly in commercial use as a three-way catalyst for simultaneously removing hydrocarbons, carbon monoxide and nitrogen oxides from exhaust gases discharged from internal combustion engines of automobiles and the like (Japanese Laid-Open Patent Publication No. 55225/1979).

One condition required of recent catalysts is better low-temperature activity after exposure to high temperatures of 800° to 900° C. or more. This is because the temperature of the exhaust gases tends to decrease as a result of higher outputs of engines and the catalyst systems are set up at a location remote from the engines.

A catalyst containing a platinum-group element or cerium oxide undergoes marked thermal degradation at high temperatures of 800° to 900° C., and does not have sufficient low-temperature activity after exposure to high temperatures, It has heretofore been known to add oxides of alkaline earth metals or rare earth metals other than cerium for increasing the heat resistance of catalysts (for example, Japanese Laid-Open Patent Publications Nos. 99988/1975 and 31994/1977).

However, the catalysts described in these patent documents have insufficient low-temperature activity after exposure to high temperatures, and cannot be said to fully adapt to the recent engine systems. It has been desired to develop a catalyst having better low-temperature activity after exposure to high temperatures.

OBJECTS OF THE INVENTION

It is an object of this invention to solve the above problem of the prior art, and to provide a catalyst which shows an excellent exhaust gas purifying capability at low temperatures even after exposure to high temperatures.

MEANS FOR SOLVING THE PROBLEM

The present inventors made extensive investigations in order to solve the above problem, and found that to increase the activity of an exhaust gas purifying catalyst after exposure to high temperatures of 800° to 900° C., it is very effective to combine palladium, rhodium, active alumina, a cerium compound, a strontium compound and a zirconium compound. This finding has led to the accomplishment of the present invention.

The above object is achieved in accordance with this invention by an exhaust gas purifying catalyst comprising a monolithic support and formed thereon an active layer composed of palladium, rhodium, active alumina, a cerium compound, a strontium compound and a zirconium compound, and a process for its production.

The invention will now be described in detail.

In the present invention, the addition of various cerium compounds, strontium compounds and zirconium compounds promotes adsorption characteristics of various gases on the catalyst, and the addition of the strontium compound and the zirconium compound inhibits sintering of palladium, rhodium and the cerium compound. The use of the cerium, strontium and zirconium compounds thus produces favorable results in increasing the low-temperature activity of the catalyst after exposure to high temperatures.

[A] The catalyst of this invention will first be described.

The exhaust gas purifying catalyst of this invention comprises a monolithic support and deposited thereon palladium, rhodium, active alumina, a cerium compound, a strontium compound and a zirconium compound as catalyst components.

An example of the monolithic support is a foamed article which is composed of a refractory metal oxide or a refractory metal and has a honeycomb or three-dimensional network structure.

Examples of the refractory metal oxide are cordierite, mullite, alpha-alumina, sillimanite, magnesium silicate, zircon, pentalite, spodumene and aluminosilicates. Examples of the refractory metal include refractory iron-base alloys, refractory nickel-base alloys and refractory chromium-base alloys.

A honeycomb support composed of cordierite is most preferably used.

The weight of palladium may be any so long as the required catalyst performance is obtained. Usually, it is 0.1 to 10 g, preferably 0.1 to 3 g, per liter of the catalyst. The weight of rhodium may be any so long as the required catalytic activity is obtained. Usually, it is 0.01 to 2 g, preferably 0.02 to 0.7 g, per liter of the catalyst.

The active alumina is, for example, preferably gamma-alumina. Desirably, it has a specific surface area of 10 to 300 m$^2$/g. Its weight is usually 30 to 200 g, preferably 40 to 150 g, per liter of the catalyst.

Cerium oxide is preferred as the cerium compound. Its weight is usually 1 to 150 g, preferably 1 to 50 g, more preferably 5 to 40 g, per liter of the catalyst.

Preferred as the strontium compound are strontium carbonate, strontium hydroxide and strontium oxide. Its weight is 0 1 to 40 g, preferably 1 to 20 g, more preferably 5 to 15 g, calculated as strontium oxide per liter of the catalyst.

Zirconium carbonate and zirconium oxide are preferred as the zirconium compound. Its weight is 0.1 to 30 g, preferably 1 to 20 g, more preferably 5 to 15 g, as ziconium oxide, per liter of the catalyst.

[B] The process for producing the exhaust gas purifying catalyst of this invention will now be described.

Preparation of Active Alumina Containing Palladium and Rhodium

Active alumina (for example, gamma-alumina) is put in a mixer. The particle diameter of the active alumina is desirably 1 to 100 microns ($\mu$), preferably 1 to 50$\mu$, more preferably 1 to 40$\mu$.

A palladium compound (such as a palladium nitrate solution or a palladium chloride solution) is added to active alumina. The palladium compound may be added little by little to gamma-alumina being stirred by a mixer, or may be added at a time. The palladium compound may be added as a solution (for example, an aqueous solution) or a suspension (for example, an aqueous suspension). The amount of the palladium compound added may be 0.5 to 150 g, calculated as palladium, or 100 to 500 ml as a solution of the palladium compound, per kg of active alumina.

Then, the rhodium compound (for example, a rhodium nitrate solution or a rhodium chloride solution) may be added little by little, or at a time, to the mixture containing the active alumina and the palladium compound. The rhodium compound may be added as a solution or suspension. The weight of the rhodium compound added may be 0.1 to 25 g calculated as rhodium, or 100 to 500 ml as a solution of the rhodium compound, per kg of active alumina.

The sequence of adding the palladium compound and the rhodium compound to active alumina may be such that the rhodium compound is first added, or the palladium and rhodium compounds are added simultaneously, or small portions of the two compounds are alternately added.

Subsequently, a solution of acetic acid, preferably a 10–40 % by weight aqueous solution of acetic acid, is added to the mixture containing the platinum-group metal compounds and active alumina. Preferably, the acetic acid solution is added little by little while the above mixture is stirred by a mixer. The amount of acetic acid added may be 50 to 300 ml per kg of active alumina.

Preparation of a Slurry

The active alumina containing palladium and rhodium and prepared by the above method, the cerium compound, the strontium compound, the zirconium compound, acetic acid and deionized water are introduced into a mill and crushed to form a slurry.

Cerium nitrate and cerium oxide are preferred as the cerium compound, and its weight is 8 to 1250 g, preferably 5 to 400 g, more preferably 40 to 300 g, calculated as cerium oxide, per kg of active alumina.

Strontium acetate and strontium hydroxide are preferred as the strontium compound. Its weight is 0.8 to 340 g, preferably 10 to 280 g, more preferably 70 to 210 g, calculated as strontium oxide, per kg of active alumina.

Zirconyl acetate and zirconyl hydroxide are preferred as the zirconium compound. Its weight is 0.8 to 250 g, preferably 10 to 280 g, more preferably 70 to 210 g, calculated as zirconium oxide, per kg of active alumina.

Acetic acid is preferably a 60–90 % by weight aqueous solution, and may be used in an amount of 10 to 200 ml per kg of active alumina. The amount of deionized water may be 50 to 1000 ml per kg of active alumina.

By the above crushing in a mill, the average particle diameter of the mixture in the slurry can be adjusted to 0.1 to 10$\mu$, preferably 1 to 5$\mu$.

The resulting slurry is transferred to a vessel, and deionized water is added to form a slurry having a predetermined specific gravity which may, for example, be 1.20 to 1.80 g/ml.

Deposition of the Slurry on a Monolithic Support

The above slurry is deposited on a monolithic support which is described in section [A] above.

The slurry is applied to the monolithic support for a period of, for example, 1 to 60 seconds, preferably 3 to 10 seconds, and then the excess of the slurry in the cells is removed by an air blow. The support having the slurry deposited thereon is subjected to hot air, preferably hot air at 20° to 100° C., to remove at least 50 % of water, preferably 90 % of water. After removing water in this manner, the support is subjected to calcination in air, for example, at a temperature of 200° to 900° C., preferably 300° to 800° C., for 10 minutes to 10 hours, preferably 15 to 60 minutes. When the temperature of the support is gradually raised in the calcination, the above drying (removal of water) may be omitted.

By the above slurry deposition step, 30 to 200 g of alumina containing palladium and rhodium, 1 to 150 g, as cerium oxide, of the cerium compound, 0.1 to 40 g, as strontium oxide, of the strontium compound and 0.1 to 30 g, as zirconium oxide, of the zirconium compound, for example, per liter of the monolithic support can be deposited on the support.

EXAMPLES

The following examples illustrate the present invention in detail.

EXAMPLE 1

(a) Active alumina having a BET surface area of 150 m$^2$/g and an average particle diameter of 30$\mu$ (1.2 kg) was put in a mixer, and while the alumina was stirred, 240 ml of an aqueous solution of palladium nitrate containing 14.6 g of palladium was added dropwise little by little and dispersed uniformly. Subsequently, 100 ml of an aqueous solution of rhodium nitrate containing 1.5 g of rhodium was added dropwise little by little and uniformly dispersed.

Finally, 80 ml of 15 % by weight acetic acid was added dropwise little by little and uniformly dispersed to prepare an alumina powder containing palladium and rhodium (Pd/Rh=10/1).

(b) The alumina containing palladium and rhodium obtained in step (a) (1000 g as dry weight), 434 g (171 g calculated as cerium oxide) of 40 % by weight cerium nitrate, 180 g (86 g calculated as strontium oxide) of strontium acetate hemihydrate, 500 g (100 g calculated as zirconium oxide) of zirconyl acetate, 72 ml of 90 % by weight acetic acid and 600 ml of deionized water were introduced into a mill, and mixed and crushed to form an alumina slurry. The crushing was carried out for a period of time which elapsed until at least 90 % of particles in the slurry had a particle diameter of not more than 9.0$\mu$.

(c) Deionized water was added to the slurry obtained in step (b) to adjust its specific gravity to 1.54 g/ml and obtain a diluted slurry. A monolithic cylindrical cordierite carrier (volume: 1.0 liter; 400 cells/in$^2$) having a diameter of 93 mm and a length of 147.5 mm was dipped for 5 seconds in the diluted slurry, and then pulled up. An air blow was applied to the carrier to remove the excess of the slurry. The carrier was dried at 30° to 60° C. and calcined at 550° C. for 30 minutes to obtain a catalyst A.

The catalyst A obtained by the series of steps (a), (b) and (c) contained 1.6 g of palladium and rhodium combined, 70 g of alumina, 12 g of the cerium compound calculated as cerium oxide, 6.0 g of the strontium compound calculated as strontium oxide and 7.0 g the zirconium compound calculated as zirconium oxide, per liter of the finished catalyst.

COMPARATIVE EXAMPLE 1

Catalyst B was prepared in the same way as in Example 1 except that strontium acetate was not added in step (b).

COMPARATIVE EXAMPLE 2

Catalyst C was prepared in the same way as in Example 1 except that zirconyl acetate and strontium acetate were not added in step (b).

COMPARATIVE EXAMPLE 3

Catalyst D was prepared in the same way as in Example 1 except that zirconyl acetate was not added in step (b).

COMPARATIVE EXAMPLE 4

Catalyst E was prepared in the same way as in Example 1 except that cerium nitrate was not added in step (b).

EXAMPLE 2

Catalyst F was prepared in the same way as in Example 1 except that in step (b), strontium hydroxide in the same amount calculated as strontium oxide was used instead of strontium acetate.

EXAMPLE 3

Catalyst G containing a strontium compound (3.0 g calculated as strontium oxide) per liter of the finished catalyst was prepared in the same way as in Example 1 except that the amount of strontium acetate added was changed to 90 g from 180 g in step (b).

EXAMPLE 4

Catalyst H containing a strontium compound (12 g as strontium oxide) per liter of the finished catalyst was prepared in the same way as in Example 1 except that the amount of strontium acetate was changed to 360 g from 180 g in step (b).

EXAMPLE 5

Catalyst I containing a strontium compound (20 g calculated as strontium oxide) per liter of the finished catalyst was prepared in the same way as in Example 1 except that the amount of strontium acetate was changed to 600 g from 80 g in step (b).

EXAMPLE 6

Catalyst J was prepared in the same way as in Example 1 except that zirconyl hydroxide in the same amount calculated as zirconyl oxide was used instead of zirconyl acetate in step (b).

EXAMPLE 7

Catalyst K containing a zirconium compound (3 g calculated as zirconium oxide) per liter of the finished catalyst was prepared in the same way as in Example 1 except that the amount of zirconyl acetate was changed to 214 g from 500 g in step (b).

EXAMPLE 8

Catalyst L containing a zirconium compound (14 g calculated as zirconium oxide) per liter of the finished catalyst was prepared in the same way as in Example 1 except that the amount of zirconyl acetate was changed to 1000 g from 500 g in step (b).

EXAMPLE 9

Catalyst M was prepared in the same way as in Example 1 except that cerium oxide in the same amount calculated as cerium oxide was used instead of cerium nitrate in step (b).

EXAMPLE 10

Catalyst N containing a cerium compound (6 g calculated as cerium oxide) per liter of the finished catalyst was prepared in the same way as in Example 1 except that the amount of cerium nitrate was changed to 217 g from 434 g in step (b).

EXAMPLE 11

Catalyst O containing a cerium compound (30 g calculated as cerium oxide) per liter of the finished catalyst was prepared in the same way as in Example 1 except that the amount of cerium nitrate was changed to 1085 g from 434 g in step (b).

TEST EXAMPLE 1

The catalysts (samples A to O obtained in Examples 1 to 11 and Comparative Examples 1 to 4) were each subjected to a durability test by the following method, and then their catalyst performances were evaluated.

Durability Test Conditions

Each of the catalysts was packed into a stainless steel multiconverter, and under the following conditions, an exhaust gas simulating an actual exhaust gas was passed through the multiconverter for 40 hours.

Air-fuel ratio: A/F=14.6
Catalyst bed temperature: 850° C.
Fuel: gasoline (lead-free)

The performance of each of the catalysts was evaluated by packing it into the same multiconverter equipped with a sampling tube, and analyzing the gas components at the inlet and outlet of the catalyst bed by means of MEXA8120 made by Horiba Seisakusho. A gas simulating an actual exhaust gas as used at this time, and the evaluation conditions were as follows:

Air-fuel ratio: 14.55, 14.7, 14.85 ($\Delta$A/F=±0.5)
SV: 133,000/hr
Catalyst inlet temperature: 400° C.
Frequency: 2.0 Hz The purification ratio of each of the components (CO, HC, $NO_x$) was shown by an average of the purification ratios at the above A/F ratios.

The results are shown in Tables 1 to 7.

TABLE 1

| Run | Sample designation | Amount of cerium oxide added (g/liter) | Amount of strontium acetate added (g/liter, as SrO) | Amount of zirconyl acetate added (g/liter, as $ZrO_2$) | Purification ratio (%) | | |
|---|---|---|---|---|---|---|---|
| | | | | | CO | HC | $NO_x$ |
| Ex. 1 | A | 12 | 6 | 7 | 64 | 76 | 58 |
| CEx. 1 | B | 12 | none | 7 | 40 | 49 | 31 |

TABLE 1-continued

| Run | Sample designation | Amount of cerium oxide added (g/liter) | Amount of strontium acetate added (g/liter, as SrO) | Amount of zirconyl acetate added (g/liter, as $ZrO_2$) | Purification ratio (%) CO | HC | $NO_x$ |
|---|---|---|---|---|---|---|---|
| CEx. 2 | C | 12 | none | none | 34 | 45 | 27 |
| CEx. 3 | D | 12 | 6 | none | 57 | 75 | 49 |
| CEx. 4 | E | none | 6 | 7 | 57 | 75 | 54 |

*1: The results for the samples were obtained by evaluation after a durability test at 850° C. for 50 hours.
*2: The weight ratio of Pd to Rh and the total amount of palladium and rhodium in the samples were constant at Pd/Rh = 10/1 and 1.6 g/liter, respectively. The number of cells was constant at 400 cpi².
*3: Conditions for evaluating purifying ability
Air-fuel ratio: 14.55, 14.70, 14.85 ($\Delta A/F = 0.5$)
Sv: 133,000/hr
Catalyst inlet temperature: 400° C.
Frequency: 2.0 Hz
Purification ratio (%): Average of the purification ratios at the above A/F ratios

TABLE 2

| Run | Sample designation | Strontium compound added | Purification ratio (%) CO | HC | $NO_x$ |
|---|---|---|---|---|---|
| Ex. 1 | A | strontium acetate | 64 | 76 | 58 |
| Ex. 2 | F | strontium hydroxide | 62 | 77 | 58 |
| CEx. 1 | B | none | 40 | 49 | 31 |

*1: The amount of the strontium compound was constant at 6 g/liter calculated as strontium oxide.
*2: Additives other than the strontium compound were cerium nitrate (12 g/liter calculated as cerium oxide) and zirconyl acetate (7 g/liter calculated as zirconium oxide).
*3, *4 and *5: Same as the footnotes *1, *2 and *3 to Table 1.

TABLE 3

| Run | Sample designation | Amount of the strontium compound added (g/liter) | Purification ratio (%) CO | HC | $NO_x$ |
|---|---|---|---|---|---|
| Ex. 1 | A | 6 | 64 | 76 | 58 |
| Ex. 3 | G | 3 | 54 | 71 | 52 |
| Ex. 4 | H | 12 | 64 | 75 | 57 |
| Ex. 5 | I | 20 | 59 | 74 | 56 |
| CEx. 1 | B | none | 40 | 49 | 31 |

*1: The strontium compound was strontium oxide, and its amount was calculated as strontium oxide.
*2: Additives other than the strontium compound were cerium nitrate (12 g/liter calculated as cerium oxide) and zirconyl acetate (7 g/liter calculated as zirconium oxide).
*3, *4 and *5: Same as the footnotes *1, *2 and *3 to Table 1.

TABLE 4

| Run | Sample designation | Zirconium compound added | Purification ratio (%) CO | HC | $NO_x$ |
|---|---|---|---|---|---|
| Ex. 1 | A | zirconyl acetate | 64 | 76 | 58 |
| Ex. 6 | J | zirconyl hydroxide | 63 | 77 | 57 |
| CEx. 3 | D | not added | 57 | 75 | 49 |

*1: The amount of the zirconium compound was constant at 7 g/liter calculated as zirconium oxide.
*2: Additives other than the zirconium compound were cerium nitrate (12 g/liter calculated as cerium oxide) and strontium acetate (6 g/liter calculated as strontium oxide).
*3, *4 and *5: Same as the footnotes *1, *2 and *3 to Table 1.

TABLE 5

| Run | Sample designation | Amount of the zirconium compound added (g/liter) | Purification ratio (%) CO | HC | $NO_x$ |
|---|---|---|---|---|---|
| Ex. 1 | A | 7 | 64 | 76 | 58 |
| Ex. 7 | K | 3 | 58 | 75 | 52 |
| Ex. 8 | L | 14 | 67 | 76 | 59 |
| CEx. 3 | D | none | 57 | 75 | 49 |

*1: The zirconium compound was zirconyl acetate, and its amount was calculated as zirconium oxide.
*2: Additives other than the zirconium compound were cerium nitrate (12 g/liter calculated as cerium oxide) and strontium acetate (6 g/liter calculated as strontium oxide).
*3, *4 and *5: Same as the footnotes *1, *2 and *3 to Table 1.

TABLE 6

| Run | Sample designation | Cerium compound added | Purification ratio (%) CO | HC | $NO_x$ |
|---|---|---|---|---|---|
| Ex. 1 | A | cerium nitrate | 64 | 76 | 58 |
| Ex. 9 | M | cerium oxide | 65 | 75 | 55 |
| CEx. 4 | E | not added | 57 | 75 | 54 |

*1: The amount of the cerium compound was constant at 12 g/liter calculated as cerium oxide.
*2: Additives other than the cerium compound were strontium acetate (6 g/liter calculated as strontium oxide) and zirconyl acetate (7 g/liter calculated as zirconium oxide).
*3, *4 and *5: Same as the footnotes *1, *2 and *3 to Table 1.

TABLE 7

| Run | Sample designation | Amount of the cerium compound added (calculated as $CeO_2$) (g/liter) | Purification ratio (%) CO | HC | $NO_x$ |
|---|---|---|---|---|---|
| Ex. 1 | A | 12 | 64 | 76 | 58 |
| Ex. 10 | N | 6 | 61 | 76 | 54 |
| Ex. 11 | O | 30 | 61 | 76 | 57 |
| CEx. 4 | E | none | 57 | 75 | 54 |

*1: The cerium compound added was cerium nitrate.
*2: Additives other than the cerium compound were strontium acetate (6 g/liter calculated as strontium oxide) and zirconyl acetate (7 g/liter calculated as zirconium oxide).
*3, *4 and *5: Same as the footnotes *1, *2 and *3 to Table 1.

EXPLANATION OF THE TABLES

Table 1

Comparison on the effect of additives on the purification ratios of the catalysts after exposure at 850° C.

Table 2

Comparison on the effect of the type of the strontium compound on the purification ratios of the catalysts after exposure at 850° C.

Table 3

Comparison on the effect of the amount of the strontium compound added on the purification ratios of the catalysts after exposure at 850° C.

Table 4

Comparison on the effect of the type of the zirconium compound added on the purification ratios of the catalysts after exposure at 850° C.

Table 5

Comparison on the effect of the amount of the zirconium compound added in the purification ratios of the catalysts after exposure at 850° C.

Table 6

Comparison on the effect of the type of the cerium compound added on the purification ratios of the catalysts after exposure at 850° C.

Table 7

Comparison on the effect of the amount of the cerium compound added on the purification ratios of the catalysts after exposure at 850° C.

It is seen from Table 1 that the catalyst (sample A) simultaneously containing the cerium compound, the strontium compound and the zirconium compound showed excellent low-temperature activity even after exposure at 850° C. When at least one of these additives was lacking, the low-temperature activity after exposure at 850° C. markedly decreased.

It is seen from Table 2 that if the strontium compound is present together with the other additives (the cerium compound and zirconium compound), the catalysts showed excel-lent low-temperature activity after exposure to high tempera-tures irrespective of the type of the strontium compound.

It is seen from Table 3 that the effect of adding the strontium compound is noted even when it is in a small amount, but the optimum range of the amount of strontium compound added, calculated as strontium oxide, is 0.1 to 40 g/liter, preferably 1.0 to 20.0 g/liter, more preferably 5 to 15 g/liter.

It is seen from Table 4 that if the zirconium compound is present together with the other additives (the cerium compound and strontium compound), the catalysts show excellent low-temperature activity even after exposure to high tempera-tures irrespective of the type of the zirconium compound.

It is seen from Table 5 that the effect of adding the zirconium compound is noted even if it is in a small amount, but the optimum amount of the zirconium compound added is 0.1 to 30 g/liter, preferably 1.0 to 20.0 g/liter, more preferably 5 to 15 g/liter, calculated as zirconium oxide.

It is seen from Table 6 that if the cerium compound is present together with the other additives (the strontium compound and the zirconium compound), the catalysts show excellent low-temperature activity irrespective of the type of the cerium compound.

It it seen from Table 7 that the optimum range of the amount of the cerium compound added is 1 to 150 g/liter, preferably 1 to 50 g/liter, more preferably 5 to 40 g/liter, calculated as cerium oxide.

EFFECT OF THE INVENTION

By depositing palladium, rhodium, active alumina, the cerium compound, the strontium compound and the zirconium compound as active compounds on the monolithic support in accordance with this invention, there can be provided a catalyst which when its activity is evaluated in terms of purification ratios at 400° C., after exposure at 850° C., increases the ratio of purifying all regulated substances by 10 to 15 % and by 30 to 40 % in an air-rich atmosphere of A/F=14.0 as compared with conventional catalysts.

We claim:

1. An exhaust gas purifying catalyst comprising a monolithic refractory support material having a three-dimensional network structure, said support material having deposited thereon an active layer comprising (a) a platinum group metal component consisting essentially of from 0.1 to 10 grams of palladium per liter of catalyst volume and from 0.01 to 2 grams of rhodium per liter of catalyst volume, the palladium and rhodium both being deposited on the same particles of active alumina, said alumina being present in the amount of from 30 to 200 grams of active alumina per liter of catalyst volume; and (b) from 1 to 150 grams, calculated as cerium oxide, of cerium compound per liter of catalyst volume; from 0.1 to 40 grams, calculated as strontium oxide, of strontium compound per liter of catalyst volume; and from 0.1 to 30 grams, calculated as zirconium oxide, of zirconium compound per liter of catalyst volume.

2. The catalyst of claim 1 wherein the palladium and rhodium compounds are pre-deposited on the active alumina prior to deposition of the active alumina on the support material.

3. The catalyst of claim 1 wherein the active alumina has a specific surface area of from 10 to 300 square meters per gram and a particle diameter of 1 to 100 microns.

4. The catalyst of claim 1 containing 0.1 to 3 grams per liter of palladium; 0.02 to 0.7 gram per liter of rhodium; 40 to 150 grams per liter of active alumina; 5 to 40 grams per liter of cerium oxide; 5 to 15 grams per liter of strontium oxide; and 5 to 15 grams per liter of zirconium oxide.

5. The catalyst of claim 1 wherein the support material is cordierite having a honeycomb structure; the active alumina is gamma-alumina; the cerium compound is selected from cerium oxide or cerium nitrate; the strontium compound is selected from strontium oxide, strontium acetate; strontium carbonate or strontium hydroxide; and the zirconium compound is selected from zirconium oxide, zirconium acetate; zirconium carbonate or zirconium hydroxide.

* * * * *